Jan. 16, 1962
D. M. BIBO
3,016,890
SYSTEM AND APPARATUS FOR IMPROVING THE
OPERATION OF AN ENGINE
Filed April 26, 1960
2 Sheets-Sheet 1
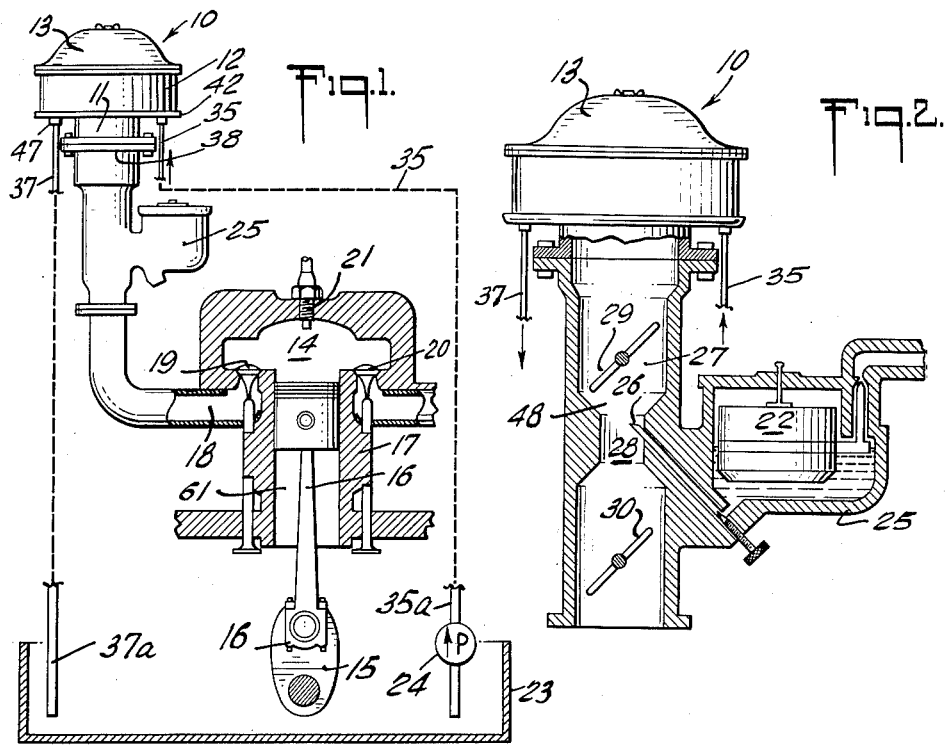
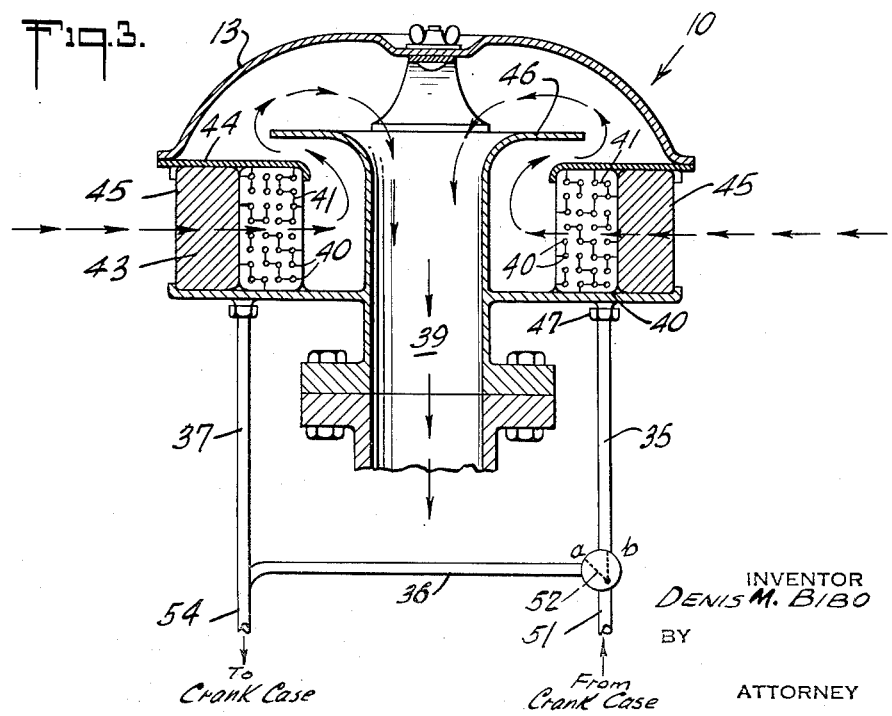
INVENTOR
DENIS M. BIBO
BY
ATTORNEY

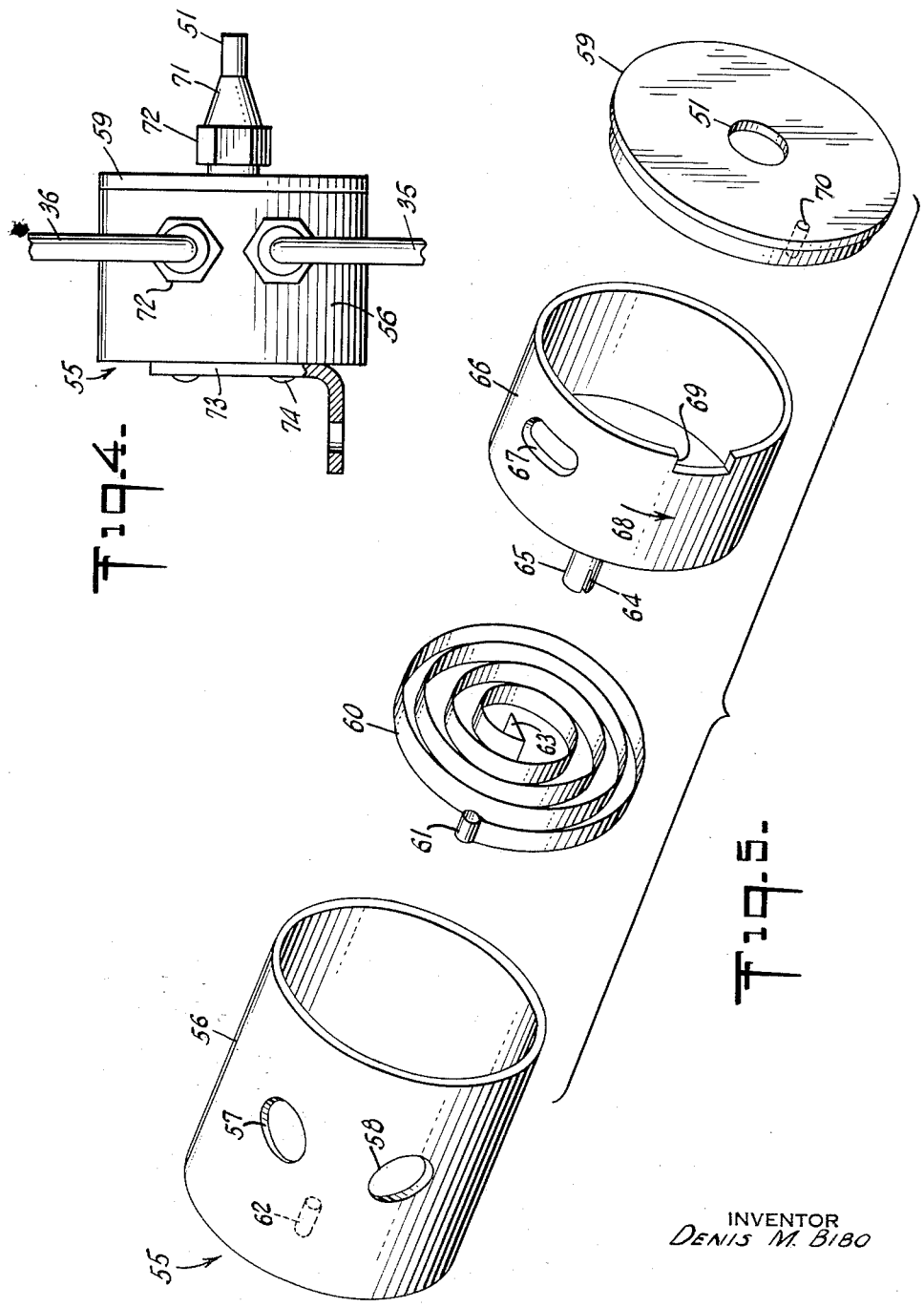

United States Patent Office 3,016,890
Patented Jan. 16, 1962

3,016,890
SYSTEM AND APPARATUS FOR IMPROVING
THE OPERATION OF AN ENGINE
Denis M. Bibo, 1 Sampson Place, Long Branch, N.J.
Filed Apr. 26, 1960, Ser. No. 24,757
12 Claims. (Cl. 123—122)

This invention pertains to a system and apparatus for improving the thermal and operating efficiency of heat engines. Specifically, the invention is directed to apparatus enabling the utilization of undesirable heat in one part of such an engine to replenish heat lost in another part thereby to attain improved carburetion and combustion and to establish a more effective viscosity ratio in the lubricant of the engine.

Though described with particularity in its application to internal combustion engines as the preferred embodiment, the advantages of the invention are not confined to engines of a single type and it will be understood that in its broader aspects the novel features of the apparatus and system herein described may apply with equal effectiveness to engines having fuel injection systems, to such units equipped with superchargers and to diesels.

Of the many attempts to improve performance of internal combustion engines and to save fuel as described in the prior art, multijet carburetors, double-walled manifolds, combinations of intake and exhaust manifolds and a wide variety of automatic valves directed to improved maintenance of the fuel-air ratio have achieved some measure of success. That none of the systems suggested has been accorded universal acceptance is probably attributable to the inability of such systems to cope with the exacting requirements of temperature and/or pressure in carburetion. The importance of the role played by temperature during and after the charging of air with a finely particled spray of volatile, inflammable liquid fuel such as gasoline, alcohol or benzol, does not appear to have been completely comprehended.

Cold starting, sudden changes in engine load and long periods of drive in low gear, as is well known, intensify the carburetion problem by introducing uncontrollable variables, the customary compensation for which, by manufacturers and servicemen, is an over-tuning adjustment of the carburetor. Overheating or underheating alike can be detrimental. Thus, in double-walled manifolds or in the use of exhaust gases to control the temperature of the intake manifold by trapping heat, overheating causes the gaseous fuel to expand in accordance with well known physical laws, thereby reducing the molecular density of the charge to the cylinders with resulting power loss. Underheating, on the other hand, usually occurs as the liquid fuel is jetted through the restricted opening between the high pressure inner region of the carburetor into the low pressure area of the chamber or conduit in which the fuel is fractionated. During carburetion, and as long as the jet is maintained, absorption of heat on the low pressure side continues to occur. The resulting temperature drop not only builds up resistance to the free flow of fuel but tends to increase the vapor particle size and to produce an overly rich fuel mixture thereby disturbing the critical fuel-air balance essential for peak engine performance.

In the instant invention, the fact that the temperature of the air destined for delivery to the mixing process is raised before it enters the carburetion chamber is an important element of the improved process described. Concomitantly, and as a by-product of the system of the invention, the convection of heat from the lubricant to the air stream is uniquely effective in maintaining the viscosity ratio of the lubricant.

In a self-contained lubricating system such as in an automobile engine, oil is consumed in various ways. It is burned in the combustion chamber; it is lost through leakage; it may disappear through the exhaust. With rapidly rising temperature as at high engine speed, viscosity of the lubricant is rapidly vitiated. At such speeds more oil flows through the crankpin bearings and more is sprayed upon the cylinder walls. Pistons do not follow the topography of cylinder walls as closely as at low speed but tend to skid thereover, causing more oil to pass to the combustion chamber to be consumed instead of being scraped back into the crankcase. Oil rings, of course, perform a real function in preventing much of this low viscosity leakage but even if these elements work well at high speeds, insidious wear due to faulty lubrication in its damaging effect upon engine parts is of far greater concern than mere loss of oil.

In the system described herein, the provision of apparatus for extracting heat from a conveyor for a lubricant and for mingling the extracted heat with a jet of fuel from a carburetor thereby to improve the operating efficiency of an engine and to maintain the most effective viscosity ratio in the lubricant in response to the load upon the engine, is the primary object of the invention. For a better understanding thereof, together with other and further objects, reference is had to the following description taken in connection with the accompanying drawings while its scope will be pointed out in the appended claims.

In the drawings:

FIG. 1 is a view in cross section of the operating parts of an internal combustion engine including a lubricating line into which the heat transfer and cooling elements of the invention are insertable and mounted in juxtaposition with a substantial portion of the surface of the porous material of an air filter.

FIG. 2 is a slightly enlarged view of the filter housing of FIG. 1, and includes a view in cross sectional detail of the carburetor and carburetion chamber of an engine to which the invention is applicable.

FIG. 3 is a cross sectional view of the apparatus of the invention including a by-pass responsive to changes of thermal or pressure condition by which the path of flow of the engine lubricant may be diverted.

FIG. 4 is an elevational view of a housing and connections for the temperature responsive control apparatus shown in FIG. 3.

FIG. 5 is an exploded view of the temperature control responsive apparatus maintained within the housing of FIG. 4.

Referring to the drawings and as shown in FIG. 1, an air filter generally indicated at 10, having a support 11, housing 12, and an interchangeable cover 13, is interconnected to the combustion chamber 14, of an engine, preferably shown here as an internal combustion engine, having crankshaft 15, connection rod 16, and piston cylinder 17, in combination with an intake manifold 18, by means of conventionally timed and operated gas intake valve 19 and exhaust valve 20. The usual spark plug 21, is supported in the cylinder head for igniting a gaseous mixture of fuel and air from the intake manifold.

A conventional carburetor 25, having a float 22, has a jet opening 26, directed transversely of a carburetion chamber 27, as shown in FIG. 2, on one side of a venturi 28, having a choke 29 and a throttle 30 on opposite sides thereof.

A typical lubricating system is shown as a crankcasing 23, a pump 24, for directing fluid lubricant through an oil manifold via a transmission line 35a, to bearings, crankshafts, pistons and other operating parts of the engine and for draining the lubricant therefrom through return lead 37a, in a manner well understood in the art.

Interchangeably mounted within the filter housing 12 in any suitable manner as by affixation to the rim of support 11 or upon flange 38 of conduit 39, is a member 40, shown in detail in FIG. 3. Member 40 may be a honeycombed arrangement of hollow lubricant conductors, a multi-ply-folded section of tubing or other suitable device maintainable in juxtaposition with a porous filter material 43 held in a perforate support 44. Member 40, which hereafter may be referred to as a heat transfer or cooler element, may be a built-in portion of lubricating line 35, or preferably it may be an attachment interconnecting open ends of the lubricating line by the application of threaded, fluid tight couplings or fittings 47, as shown in FIG. 2. As an attachment, the cooler element may be applied to a wide variety of engines simply by utilizing different interchangeable supports or fittings depending upon the structure of the engine to which the element is applied.

A most important consideration in connection with the cooler element is that it be mounted in such a way that the full volume of air drawn in by suction of the engine be directed over the entire surface of the element, which though shown installed within the filter housing 10, could be inserted with equal effect within an air duct in motors or engines exhibiting such a feature. In the latter installations, the cooler element may sometimes serve to perform the function of silencer 46.

It will be apparent that the location of element 40 thus is a matter of choice and the invention is not to be limited thereby except as to a location which must secure maximum contact between the surface of the element and the air delivered to the carburetion chamber of the engine. A material such as aluminum or copper having good thermal transmitting properties should serve excellently for the purposes described.

Another important feature of the invention is the manner in which the normal path of flow of the engine lubricant may be extended within the confines of the filter or other air chamber by increasing the honeycombing or extending the folds of cooler element 40 in accordance with characteristics of a particular engine, for example cycling speed, cylinder volume, compression ratio, operating temperatures or other factors which may best be determined at the time of installation.

In FIGS. 2 nad 3 enlarged details of the relative positioning of fuel line connections 35, filter housing 12, air heating member 40, a carburetor 25, in communication with carburetion chamber 48, are shown.

Included also in these figures is a novel form of thermally responsive or pressure sensitive by-pass for lubricant delivered from the oil pump through threaded connector 47. Preferably, the length of the element 40 is increased by folding, coiling or otherwise extending sections of tubular material of which it is formed. As is well understood in the art, engines of the type to which the present invention has application, require richer mixture of fuel when started cold. Under such conditions it may be undesirable to subject the lubricant to a decrease in temperature until the engine has had an opportunity to warm up. Accordingly, means are provided for diverting the path of flow of lubricant from member 35 in response to a change in the thermal condition of the circulated lubricant.

A thermally responsive or pressure sensitive deflector 52 is schematically depicted for this purpose. Should the temperature of the lubricant in the line 51, drop for any reason, a conventionally operated device within the deflector housing, will cause member 52 to move from position *a* to position *b*, thereby shunting the flow of lubricant from member 35, to channel 36 interconnecting lubricating lines 51, and 54, leading to and from the crankcase of the engine. The structure of element 52 forms no part of the invention claimed but may be one of several types of commercially available, conventionally operable, bimetallic or pressure sensitive structures well known to those skilled in the art.

In FIGS. 4 and 5 are shown exterior and interior views of a preferred form of temperature responsive member suitable for altering the path of flow of lubricant from one line to another so as to include or bypass cooler element 40 shown in previous figures in the lubricant flow path in response to variations in temperature or pressure. A temperature responsive member of the type under consideration is schematically depicted as member 52 in FIG. 3.

The temperature responsive unit is contained within an apertured casing 56, having an apertured cover 59, threadably or otherwise engageable therewith and a supporting bracket 73, attachable to the engine casing or other support as by rivets 74, or screws (not shown). Aperture for fluid delivered from the lubricating pump. Suitable threaded connectors 72 maintain the fluid tight condition of the casing at all apertures.

In FIG. 5, apertures 57 and 58, through which fluid may be delivered alternatively through line 35 or line 36, are clearly shown. Supported upon the base 55, as by a pin 62, is a bimetallic element 60, here depicted in the form of a spiral, an eye 61 of the outer end of the spiral being slidably positionable over the pin. The inner end 63, of the spiral may be bent or shaped in any suitable manner for insertion within a slot 64 in shaft 65, extending from a closed face of the drum 66, which is thus suspended within the casing and is free to turn with respect thereto in response to the expansion or contraction of the spiral 60.

A recess 69 in the wall of the drum 68 provides for the insertion therein of a pin or other suitable stop 70, welded or otherwise suitably fixed to the underside of cover 59, to limit the movement of drum 66, in either of two directions as induced by the expansion or contraction of bimetallic element 60.

It will be understood that the temperature responsive apparatus herein depicted provides unique means for automatically transferring or diverting the flow of engine lubricant through alternative channels exhibiting different path lengths and consequently different temperature characteristics. Thus, if the engine is started cold, bimetallic element 60, is contracted, drum 66, thereby is rotated in the direction of the arrow of FIG. 5, and elongated aperture 67, is moved into coincidence with aperture 58 in the casing. Lubricant flowing into the casing through line aperture 51, therefore, is directed through bypass connector 36.

As the temperature of the engine and that of the lubricant rises, drum 66 rotates in an opposite sense as the bimetallic element expands, the aperture 67 moves out of coincidence with aperture 58 and into coincidence with aperture 57, thereby diverting the flow of lubricant from line 36 to line 35 thereby reintroducing the cooler element 40 into the lubricant flow path.

The flow of lubricant in which the bimetallic, temperature responsive element 60, is immersed, never ceases while the engine is running. Thus, regardless of the position of drum 66, and aperture 67, a proper selection of the angle between apertures 57 and 58, and suitable limitation of the movement of drum 66, by the stop 70, will insure disposal of lubricant from line 51, through bypass 36 or through line 35 and cooler element 40, or through both channels simultaneously, in response to the temperature of the fluid in which the element 60 is immersed. It will be apparent, also that the pressure exerted by the lubricant within the casing 56, may be equalized in any suitable manner, for example, by the insertion of slits or perforations in the bottom of drum 66.

In the manner described, the cooling effect of air in the filter or other chamber 60, upon the casing of the cooler element 40, may be temporarily nullified. It will be noted also that when the lubricant by-passes the cooler element, the path of flow of the lubricant from and to the crankcase is substantially shortened and the time interval normally required for the engine to warm up the lubricant is substantially reduced. As the engine continues to run, the temperature of the lubricant rises rapidly and movement of thermally responsive or pressure sensitive member 52 is affected in an opposite sense thereby rechanneling the lubricant through its normally extended path through lead 35 and heat transfer element 40.

The operation of the apparatus of the invention now should be clear. As the engine is started, fuel from the carburetor 25, is vaporized by jet protrusion 26, and mixed with cold air sucked through the filter 10 by the action of piston 16, in cylinder 61, for delivery to combustion chamber 14. Coincidentally, starting of lubricant pump causes oil to circulate through transmission line 51, for delivery to moving parts of the engine. If the temperature of the lubricant is below a predetermined level, thermally or pressure responsive member 52, will deflect the path of flow of the lubricant causing same to move through by-pass member 36, by the shortest available route and direct same to the heating effect of combustion thus avoiding the heat loss normally experienced as cold air passes through and over the folds or coils of member 40.

As the engine continues to run, continued ignition of the fuel in the cylinder quickly raises the temperature of the circulating oil causing the control device 52, to reverse its position from b to a, thus diverting the path of flow of the heated lubricant through connectors 35, and into cooling member 40. As the r.p.m. of the engine increase, more cold air is drawn in through the filter and the effect of heat transfer from the cooling element 40, to the air stream rushing through the filter to fuel mixing and distributing chambers is greatly enhanced. This effect may be improved to an even greater degree by extending suitably contoured baffles or supporting fins 41 along the surface of member 40 thereby assuring that the entire surface of the member will be subjected to the heating convection section of air circulated through the filter.

The air thus warmed flows in a stream deflected by baffles or silencer 46, to meet the jet of fuel delivered by pressure differential through constriction 26, and is thoroughly mixed therewith. The mixing of preheated air with the fuel eliminates many of the difficulties experienced in the operation of prior art structures wherein cold air and the fuel subjected to the drop in temperature normally experienced during the operation of a jet are suddenly subjected to high temperature induced by double-manifolding or other expedient by which the fuel-air mixture is subjected to heating after carburetion. In contradistinction, experiments have shown that heating the air before carburetion not only improves the carburetion value and combustion but if applied in the manner of the invention causes a drop of 60 to 70 degrees in the temperature of the lubricant emerging from the cooling action of air upon member 40 as compared to the uncirculated lubricant remaining in the crankcase.

The preheated fuel-air mixture thus is more uniformly maintained without molecular loss in the combustion charge due to the expansion of the gaseous content of the mixture delivered from the relatively low temperature area in the vicinity of the jet chamber 27, to the abnormally high temperature area within the intake manifold 18.

It will be understood that the invention is not to be limited to the specific arrangement of components herein shown but that wide modifications may be permissible within the scope of the novel features defined by the claims.

What is claimed is:

1. In a system for replenishing heat lost by vaporization of fuel in the carburetion chamber of an engine, the improvement comprising apparatus for raising by convection the temperature of air passing through a filter before carburetion takes place including an element in direct communication with the lubricating line of said engine and mounted in the housing of said filter to provide a passageway for the flow of heated lubricant; means responsive to an increase in the load upon said engine for delivering increased quantities of air at higher temperature to the carburetion chamber of said engine and means including an apertured member movable in response to a change in the temperature of said lubricant to divert the flow of said lubricant so as to bypass said element.

2. In a system for replenishing heat lost by vaporization of fuel in the carburetion chamber of an engine, the improvement comprising apparatus for lowering by convection the temperature of lubricant circulated under pressure through a member detachably mounted in an air chamber of said engine and in direct communication with the lubricating line of said engine; means responsive to an increase in the load upon said engine for rendering more effective the convective cooling action of filtered air upon said element and means responsive to a drop in the temperature of said lubricant to divert the path of flow of said lubricant so as to bypass said element.

3. In a system for improving the thermal efficiency of a heat engine in which filtered air is delivered to the combustion chambers of said engine, comprising means for circulating lubricating oil from a crankcase; means tending to equalize by convection the temperature of said oil and the temperature of the filtered air stream prior to the delivery of said air stream to the intake manifold of said engine; and temperature responsive means for diverting the path of flow of said circulated oil so as to render ineffective the temperature equalizing tendency induced by the passage of said air stream.

4. In a system for improving the thermal efficiency of an internal combustion engine, the combination comprising an air filter; a conductor for heated lubricant; a carburetion chamber; a heat radiating element insertable between open ends of said conductor; a support for said element detachably mounted upon the housing of said chamber; and means including the passage of air from said filter and over the surface of said element to reduce the temperature of said lubricant and means responsive to a reduction in the temperature of said lubricant to reduce the flow of lubricant through said heat radiating element.

5. In a system for filtering and increasing the temperature of air delivered to the intake manifold of a combustion engine, the improvement comprising means for circulating lubricant from said engine through a filter chamber; a fluid channeling member detachably mounted in close proximity to a surface of said filter material; means for directing air over a substantial portion of the surface of said fluid channeling member to reduce the temperature of the fluid therein and to increase the temperature of the air drawn thereover; and thermal responsive means adapted to divert the path of said fluid to by-pass said filter chamber.

6. An element interchangeably mounted upon the housing of the carburetion chamber of an engine comprising a support for a casing; a cover for said casing; a perforate, cylindrical holder for porous material insertable within said casing; a cooler element detachably mounted upon the housing of said carburetion chamber and in juxtaposition with the inner surface of said holder; means connecting opposite ends of said cooler element to the lubrication line of said engine; means including the transmission of heated lubricant through said element for raising the temperature of air delivered through said porous material and means responsive to a drop in the temperature of said engine to cause said lubricant to bypass said cooler element.

7. An element interchangeably mounted upon the housing of the carburetion chamber of an engine comprising a support for a casing; a cover for said casing; a perforate, cylindrical holder for porous material insertable within said casing; a cooler element detachably mounted upon the housing of said carburetion chamber and in juxtaposition with the inner surface of said holder; means connecting opposite ends of said element to the lubrication line of said engine; means including the extracting of heat from lubricant flowing through said element for increasing the temperature of air delivered over the surface of said element and means responsive to a change in the temperature of the lubricant in said line to reduce the flow of lubricant through said element and to increase the flow of said lubricant through a channel by-passing said element.

8. In an internal combustion engine, means responsive to the load upon said engine for decreasing the temperature of a lubricant circulated by said engine through a member insertable in the lubricating line of said engine and temperature responsive means for altering the path of flow of said lubricant so as to by-pass said element and to render ineffective said load responsive means.

9. In an internal combustion engine, means responsive to the load upon said engine for increasing the temperature of air delivered through a filter housing interconnected by a passageway to the intake manifold of said engine, and means responsive to a change in the temperature of oil circulated through a tubular element mounted in said filter housing and detachably connected in the lubricating line of said engine for causing said circulated lubricant to by-pass said element and render ineffective said load responsive means.

10. In an internal combustion engine, means responsive to load upon said engine for decreasing the temperature of a lubricant circulated through a member detachably insertable in the lubricating line of said engine; means for increasing the temperature of air delivered to the carburetor of said engine through an air filtering member surrounding said element; and means responsive to the temperature of the lubricant circulated through said element for diverting the path of flow of said lubricant so as to by-pass said element and to render ineffective said load responsive means.

11. In a system for improving the thermal efficiency of an internal combustion engine and for maintaining the viscosity of a lubricant circulated in said engine in which filtered air is drawn into a passageway interconnecting filter and combustion chambers of said engine, the improvement comprising a folded tubular element detachably insertable in the lubricating line of said engine; means for mounting said element in juxtaposition with a surface of a strainer of said filter; means for circulating lubricant through said element; means for concentrating cool air delivered through said filter over a substantial portion of the surface of said element; pressure responsive means for diverting the path of flow of said lubricant so as to by-pass said element; and means responsive to a change in the temperature of said engine to redirect the path of flow of said lubricant through the folds of said element.

12. A method of improving carburetion and the viscosity ratio of lubricant in an internal combustion engine comprising the steps of filtering air; circulating oil from the crankcase of said engine across the path of air drawn through said filtering means; diverting and elongating the path of circulation of said oil in response to a change in the temperature of said engine to subject said oil to the cooling effect of air in the vicinity of said filter.

References Cited in the file of this patent

UNITED STATES PATENTS

| | | |
|---|---|---|
| 1,855,308 | Niven | Apr. 26, 1932 |
| 2,105,433 | Noble | Jan. 11, 1938 |